United States Patent [19]

McLean

[11] 4,425,898

[45] Jan. 17, 1984

[54] GASEOUS FUEL-AIR MIXTURE DEVICE

[76] Inventor: Kerry L. McLean, 20540 Westhampton, Southfield, Mich. 48075

[21] Appl. No.: 319,636

[22] Filed: Nov. 9, 1981

Related U.S. Application Data

[63] Continuation-in-part of Ser. No. 138,434, Apr. 8, 1980, Pat. No. 4,335,697.

[51] Int. Cl.³ ............................................ F02M 21/02
[52] U.S. Cl. .................................... 123/527; 123/525; 48/180 C
[58] Field of Search .................. 48/180; 123/527, 525

[56] References Cited

U.S. PATENT DOCUMENTS

| | | | |
|---|---|---|---|
| 797,278 | 8/1905 | Harper | 123/527 |
| 2,420,562 | 5/1947 | Rathbun | 123/527 |
| 2,939,775 | 6/1960 | Middleton | 123/527 |
| 3,646,924 | 3/1972 | Newkirk | 123/527 |
| 4,335,697 | 6/1982 | McLean | 123/527 |
| 4,351,300 | 9/1982 | Seluidge | 123/527 |

FOREIGN PATENT DOCUMENTS 52-44326  4/1977  Japan .................................. 123/525

*Primary Examiner*—Ronald B. Cox
*Attorney, Agent, or Firm*—Hauke and Patalidis

[57] ABSTRACT

A gaseous fuel-air mixture device for an internal combustion engine having an intake for a fuel-air mixture. A chamber for mixing gaseous fuel and air is provided above the intake. The gaseous fuel is uniformly injected into the mixture chamber from an aperture in the chamber wall. The quantity of air mixed with the gaseous fuel in the mixture chamber is controlled by adjusting the height of a control plate disposed above the chamber.

7 Claims, 3 Drawing Figures

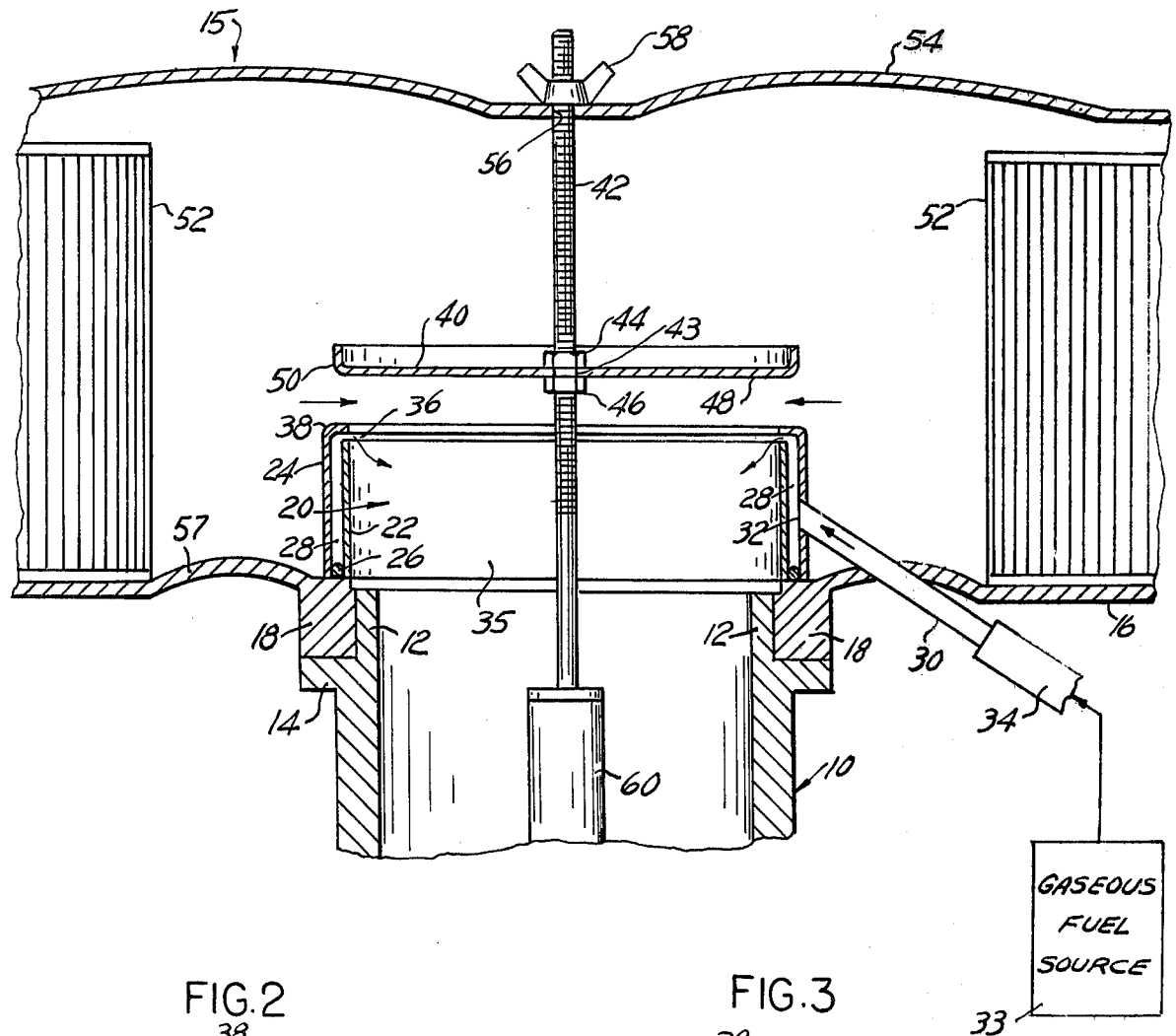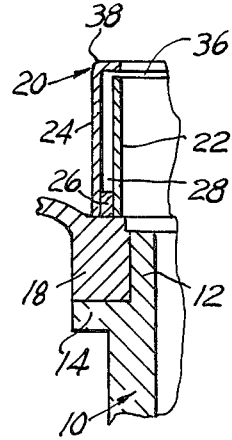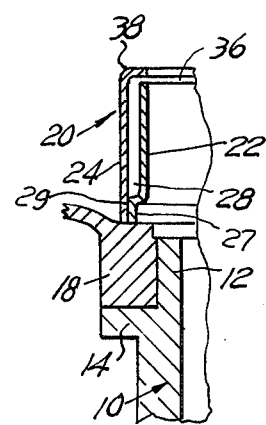

GASEOUS FUEL-AIR MIXTURE DEVICE

CROSS-REFERENCE TO RELATED APPLICATION

The present application is a continuation-in-part of co-pending application Ser. No. 138,434, filed Apr. 8, 1980, now U.S. Pat. No. 4,335,697.

BACKGROUND OF THE INVENTION

The present invention relates to a gaseous fuel-air mixture device for internal combustion engines. The device is suitable for use with an engine equipped to run only on gaseous fuel, such as LP gas or on conventional liquid fuel, such as gasoline.

The air pollution problems inherent in the operation of gasoline fueled and diesel-oil fueled internal combustion engines are well known. Although various emission control devices have been used in the past and are presently in use, and although emission control devices are required by federal legislation and regulations to reduce the amount of pollutants discharged in the atmosphere by internal combustion engines, emission control devices are not entirely satisfactory, they are subject to deterioration with the passage of time, and they are often a hindrance preventing the internal combustion engine from operating at best efficiency and at an economical fuel consumption rate.

Natural gas and LP gases, such as propane and butane, have been proposed as a replacement for conventional liquid fuels such as gasoline, for the purpose of reducing atmospheric pollution, reducing consumption of fossil fuels, decreasing the operating costs of internal combustion engines, as compared to the costs of operating on gasoline, and the volume of contaminant emission, as compared to gasoline, without complex emission control devices, or for the purpose of entirely eliminating emission control devices.

LP gases, such as butane and preferably propane, are particularly suitable for fueling internal combustion engines. For example, propane is in a liquid phase under a relatively low pressure at room temperature and requires only thin-walled tanks for safe containment. Many systems using LP gases for fueling internal combustion engines have been proposed and some are presently in use in particular applications such as for service trucks, small tractors, lift trucks and the like, in manufacturing plants and in mines, and for fueling motor vehicles operated by LP gas producers, distributors and dealers.

Vehicles designed to operate on gaseous fuels will be particularly useful to their owners in times when gasoline and diesel fuel become short in supply or are totally unavailable. Other drivers may prefer a vehicle with a dual fuel system, operable on gasoline and gaseous fuel, for example, to protect them in times of shortage.

An example of a dual fuel system for a motor vehicle, where the vehicle can be operated on gaseous fuel or on a conventional liquid fuel such as gasoline is disclosed in co-pending application Ser. No. 138,434, filed Apr. 8, 1980. The invention there disclosed accomplishes the mixing of gaseous fuel and air by means of a proportional mixer where an outer venturi member has an inner smaller diameter venturi member disposed concentrically therein. A gaseous fuel line is connected to an elbow fitting ending in a nozzle disposed concentrically within the inner venturi member and disposed substantially in a plane corresponding to the plane of smallest diameter of the interior of the inner venturi. In such manner, the air flowing into the outer venturi on its way to the intake throat of the carburetor creates a maximum drop of pressure at the outlet of the inner venturi member, thus causing a high velocity flow through the inner venturi. The outlet of the gas supply nozzle being placed on the plane of maximum velocity of the air flow through the inner venturi creates maximum suction of the supplied gas providing thorough mixing of the gas with the entrained air, maximum flow of gas with full throttle opening, minimum flow of gas with fully closed throttle, except for idling adjustment, and no flow of gas upon shutting off the engine, as the pressure of the gas flowing through the low pressure line and the nozzle is lower than atmospheric pressure.

In other heretofore known gaseous fuel systems or dual fuel systems, costly additional mixing systems are required, thus necessitating the replacement of the conventional gasoline carburetor, or, in the alternative, the mounting of a complex gas mixer at the inlet of the carburetor or the mounting of a flange adapter between the carburetor and the engine inlet manifold. What is needed, therefore, is a simple and inexpensive gaseous fuel-air mixture device for gaseous fuels which does not necessitate the replacement of a conventional carburetor.

SUMMARY OF THE INVENTION

The principal object of the invention is to provide a relatively simple but efficient gaseous fuel-air mixing device for an internal combustion engine allowing the internal combustion engine to run on conventional liquid fuel or gaseous fuel, without any modification to the internal combustion engine, or to the liquid fuel system in installations wherever the liquid fuel system is left undisturbed. The present invention also provides a gaseous fuel-air mixing device for a conventional internal combustion engine which may be substituted for the gasoline fuel system if so desired, although when used in a dual fuel system it permits to run an internal combustion engine on gasoline fuel or gaseous fuel, at will, and to switch from one type of fuel to the other without requiring special adjustment or set-up of the carburetor system or of the ignition system.

This and other objects of the present invention will become apparent to those skilled in the art, when the following description of an example of the best modes contemplated for practicing the invention is read in conjunction with the accompanying drawing wherein:

BRIEF DESCRIPTION OF THE DRAWING

FIG. 1 is a partial cross-sectional view of a carburetor inlet and gaseous fuel/air mixer affixed thereto, according to the present invention; and FIGS. 2 and 3 are partial views similar to FIG. 1, and showing modifications thereof.

DETAILED DESCRIPTION OF THE PREFERRED EMBODIMENT

The present invention relates to a simple structure for mixing and feeding gaseous fuel and air to the intake of an internal combustion engine. The engine to which the invention is applied is conventional in all respects. Accordingly, only those parts which are necessary to illustrate the invention are included in the drawings.

Referring now to FIG. 1, there is schematically illustrated in section the inlet of a conventional carburetor 10. The carburetor 10 is of the usual type having at its inlet a rim 12 provided with a recessed outwardly projecting annular flange 14. An air filter 15 is fastened over the inlet of the carburetor. The housing 16 of the air filter 15 is, for that purpose, is provided with an opening having a flange 18 seating against the carburetor flange 14 concentrically to the carburetor rim 12.

In the example of structure illustrated, an annular gaseous fuel-air mixer 20 is fastened to the inlet of the carburetor 10. The annular gaseous fuel-air mixer 20 is formed integrally with the air filter housing 16 above the housing flange 18, or attached thereto by welding, soldering, brazing or cementing. The annular mixer 20 is formed of a pair of inner and outer concentric cylindrical walls 22 and 24. The inner cylindrical wall 22 of the annular mixer 20 is separated from the outer wall 24 by an annular spacer 26. As shown at FIG. 1, the spacer 26 is circular in cross-section. As shown at FIG. 2, the spacer 26 is of square or rectangular cross-section. The spacer 26 can be made of any suitable material, such as a metallic or plastic material, and the concentric walls 22 and 24 of the mixer 20 are preferably made of the same material as the spacer 26 and are attached thereto by any convenient means such as welding, brazing, soldering or cementing. Alternatively, as shown at FIG. 3, the inner cylindrical wall 22, for example, may be provided with a stapped flange 27 forming an annular rim 29 over which the outer cylindrical wall 24 is press-fitted.

The inner cylindrical wall 22 and the outer cylindrical wall 24 of the mixer 20 are thus spaced apart such that a relatively narrow annular chamber 28 is formed between the concentric cylindrical walls 22 and 24. When the internal combustion engine is being operated on gaseous fuel, the fuel is supplied to the annular chamber 28 by means of a conduit 30 having an outlet 32 leading into the annular chamber 28. The fuel line or conduit 30 is connected to a gaseous fuel source 33 through a hose 34.

The gaseous fuel flowing from the fuel source 33 through the fuel line 30 into the annular chamber 28 is introduced to the fuel-air mixing chamber 35 defined in the cylindrical space peripherally bordered by the mixer inner wall 22 through a circular slot 36 disposed at the top of the annular chamber 28. As shown at FIG. 1, the outer cylindrical wall 24 of the mixer 20 is slightly higher than the inner cylindrical wall 22 and is provided with an inwardly curved flange 38 at its upper edge for radially directing the flow of gaseous fuel through the circular slot 36 into the fuel-air mixing chamber 35 for mixing with the air being drawn into the inlet of the carburetor 10. The circular slot 36 is of constant width and thereby permits the introduction of gaseous fuel to the fuel-air mixing chamber 35 in uniform proportions.

It is apparent that configurations other than the circular slot 36 are possible for forming an aperture suitable for permitting the flow of gaseous fuel from the annular chamber 28 to the mixing chamber 35. For example, the inner cylindrical wall 22 and the outer cylindrical wall 24 may be sealed together at their respective top edges and a circular slot or a plurality of ports provided through the inner cylindrical wall 22 of the mixer 20.

The relative proportion of air to gaseous fuel being introduced to the mixing chamber 35 is controlled by an adjustable control plate 40. When the gap between the plate 40 and the top edge of the fuel-air mixer 20 is relatively wide, the ratio of air to gaseous fuel mixture introduced into the mixing chamber 35 is relatively large. On the other hand, the control plate 40 can be set relatively near the top edge of the mixer 20 so as to constrict the flow of air into mixing chamber 35 and reduce the air to fuel ratio.

As shown, the plate 40 is adjustably mounted on a threaded rod 42, the rod being passed through an aperture 43 in the center of the plate 40. The plate 40 is secured in position along the rod 42 by means of two nuts 44 and 46 disposed one above and the other below the plate 40. It is readily apparent that the relative height of the plate 40 above the mixing chamber 35 is adjusted by the simple means of moving one of the nuts 44 or 46 a given distance on the rod 42 and advancing the other nut the same distance.

The adjustable control plate 40 is preferably dish-shaped with a relatively narrow upwardly curved rim 50. It has been determined experimentally that a dished-shaped control plate 40 having such a rim 50 best directs a stream of air being drawn through an air filter 15 into the mixing chamber 35 disposed beneath the plate 40.

In the example shown, the rod 42 on which the plate 40 is mounted also serves as a means for affixing in position a conventional air filter cover 54 resting on the top of an annular air filter element 52 as is well known in the art. The rod 42 is disposed through a central aperture 56 in the air filter cover 54. At its bottom edge, the air filter element 52 seats against the bottom portion 57 of the air filter housing 16, as is also well known. A wing nut 58, threaded on the rod 42, removably secures the air filter cover 52 in position. The rod 42 is fastened at its lower end to an appropriate portion 60 of the carburetor housing, as is conventional.

As stated hereinbefore, the fuel-air mixer 35 can be made integrally with the air filter housing 16 or, preferably, it can be made separate from the housing and welded, soldered, brazed or cemented in position.

Having thus described the present invention by means of a practical example of structure, improvements of which will be obvious to those skilled in the art, what is claimed as new is as follows:

1. A gaseous fuel-air mixer for an internal combustion engine having an intake for a fuel-air mixture, said intake being a liquid fuel conventional carburetor inlet and said gaseous fuel-air mixer comprising a tubular member mounted at said carburetor inlet, said tubular member surrounding said inlet and having an open end through which air is admitted, means for supplying a gaseous fuel to a mixing chamber defined within said tubular member, and a generally flat plate, said plate being axially adjustable along the carburetor inlet axis and disposed across the open end of said tubular member defining said mixing chamber for adjusting the proportion of air admitted to said mixing chamber, wherein said gaseous fuel is supplied to said mixing chamber through an aperture in said tubular member, said tubular member has a pair of parallel circularly cylindrical walls disposed concentrically for forming therebetween an annular chamber, and said aperture is a circular slot in the innermost of said cylindrical walls.

2. The mixer of claim 1 wherein the outermost of said cylindrical walls is slightly higher than the innermost of said cylindrical walls and has an inwardly directed edge flange, and said circular slot is determined by a space between said flange and the upper edge of said innermost cylindrical wall.

3. The mixer of claim 1 wherein at least one spacer of a constant width is affixed between said concentric cylindrical walls.

4. The mixer of claim 1 wherein said means for supplying gaseous fuel to said mixing chamber is a conduit leading into said annular chamber for connecting said annular chamber to a supply of gaseous fuel.

5. The mixer of claim 1 wherein said adjustable plate has a relatively narrow curved flange.

6. The mixer of claim 1 wherein said adjustable plate is adjustably mounted on a rod disposed concentrically to said tubular member.

7. The mixer of claim 1 wherein said tubular member is disposed within an air filter housing.

* * * * *